(12) United States Patent
Matz

(10) Patent No.: US 11,678,768 B2
(45) Date of Patent: Jun. 20, 2023

(54) AIR CIRCULATION DEVICE

(71) Applicant: Dansons US, LLC, Phoenix, AZ (US)

(72) Inventor: Garrett Matz, Phoenix, AZ (US)

(73) Assignee: Dansons US, LLC, Scottsdale, AZ (US)

(*) Notice: Subject to any disclaimer, the term of this patent is extended or adjusted under 35 U.S.C. 154(b) by 161 days.

(21) Appl. No.: 17/103,342

(22) Filed: Nov. 24, 2020

(65) Prior Publication Data

US 2022/0160174 A1  May 26, 2022

(51) Int. Cl.
*A47J 37/07* (2006.01)
*A23B 4/052* (2006.01)
*F24C 15/00* (2006.01)

(52) U.S. Cl.
CPC ......... *A47J 37/0786* (2013.01); *A23B 4/0523* (2013.01); *A47J 37/0718* (2013.01); *F24C 15/006* (2013.01); *A23V 2002/00* (2013.01)

(58) Field of Classification Search
CPC ............... A47J 37/0786; A47J 37/0718; A47J 37/0664; A47J 37/0704; A47J 37/0709; A47J 37/0713; A23B 4/0523; F24C 15/006; A23V 2002/00
See application file for complete search history.

(56) References Cited

U.S. PATENT DOCUMENTS

| | | | | |
|---|---|---|---|---|
| 4,505,489 A | * | 3/1985 | Specie | B62B 5/0089 280/47.23 |
| 9,339,145 B1 | * | 5/2016 | Owczarzak | A47J 37/0713 |
| 10,710,623 B1 | * | 7/2020 | Stys | B62B 5/067 |
| 2005/0051157 A1 | * | 3/2005 | Cuomo | A47J 36/36 126/275 R |
| 2006/0213497 A1 | * | 9/2006 | Orozco | A47J 37/0786 126/41 R |
| 2014/0053739 A1 | | 2/2014 | Safar | |
| 2014/0053823 A1 | * | 2/2014 | Frantz | A47J 37/0763 126/39 B |
| 2014/0224750 A1 | * | 8/2014 | Vogds | A47J 37/0786 211/13.1 |
| 2016/0198897 A1 | * | 7/2016 | Wenzel | A47J 37/0704 99/445 |

(Continued)

FOREIGN PATENT DOCUMENTS

| | | |
|---|---|---|
| KR | 101343685 B1 * | 12/2013 |
| KR | 20200024634 | 3/2020 |
| WO | 2020030824 | 2/2020 |

OTHER PUBLICATIONS

European Search Report for Application No. 21209733.1, dated May 13, 2022, 10 pages.

(Continued)

*Primary Examiner* — Ibrahime A Abraham
*Assistant Examiner* — Franklin Jefferson Wang
(74) *Attorney, Agent, or Firm* — Seyfarth Shaw LLP

(57) ABSTRACT

Disclosed is an air circulation device for an outdoor cooking appliance such as a grill. The device helps circulate air more consistently and efficiently by providing slats that direct rising air in a cyclonic arrangement. By providing this cyclonic effect, the air circulation device can distribute heat and smoke more evenly to the food being cooked and improve smoke penetration, heat efficiency, and the evenness of cooking.

16 Claims, 5 Drawing Sheets

(56) References Cited

U.S. PATENT DOCUMENTS

2018/0028017 A1\* 2/2018 Wu .................... A47J 37/0664
2020/0116349 A1\* 4/2020 Rahmani ................. F24B 1/207

OTHER PUBLICATIONS

Canadian Office Action for Application No. 3,139,707, dated Jan. 12, 2023, 3 pages.
Australian Examination Report No. 1 for Application No. 2021266365, dated Nov. 4, 2022, 3 pages.

\* cited by examiner

AIR CIRCULATION DEVICE

TECHNICAL FIELD OF THE INVENTION

The presently disclosed embodiments relate generally to outdoor cooking appliances. More particularly, the presently disclosed embodiments relate to air circulation devices for outdoor grills, smokers, heaters, or other appliances.

BACKGROUND OF THE INVENTION

Grilling is a prevalent activity in today's society. Once a simple concept with charcoal and a match, grilling has become a favorite activity amongst Americans and internationals alike. Consumers enjoy the outdoor atmosphere and social aspect of grilling, while their tastebuds enjoy the flavors provided by the charcoal, pellets, wood, or other fuel used to heat and cook the food being grilled.

Smokers are a type of outdoor cooking appliance that uses a "low and slow" approach to outdoor cooking. Smokers heat fuel such as wood chunks, chips, or pellets at a low heat to release smoke from the fuel and cook food at a low temperature for a longer period of time. Certain foods become more tender because of this process and the people who prepare food in this manner tend to invest time and money into the smoking process as a popular hobby. So-called "pit masters" look for any opportunity or technology to improve the food created by their barbecue smoker.

One desired outcome of smoked food is deeper smoke penetration and a "smoke ring" visible when the food is cut along a cross-section. Pit masters dispute how this smoke ring is made, but consumers generally prefer a deeper smoke ring and believe consistent and well-circulated smoke is an effective way to obtain it.

SUMMARY OF THE INVENTION

The presently disclosed embodiments relate generally to an air circulation device for an outdoor cooking appliance, such as a grill, that helps circulate air more consistently and efficiently as compared to if the air circulation device was not provided in the appliance. For example, the air circulation device can have slats that extend along a non-zero angle with respect to the plane in which the device sits, and can therefore cause a cyclonic movement of smoke as it rises from a fuel chamber where fuel is being combusted. By providing this cyclonic effect, the air circulation device can therefore distribute heat and smoke more evenly to the food being cooked, potentially providing better smoke penetration and a deeper smoke ring while more effectively, evenly, and efficiently cooking the food.

For example, the presently disclosed embodiments relate to an appliance including a base, a fuel cage located within the base and configured to accept fuel to be combusted, and an air circulation device located above the fuel cage. The air circulation device includes an apex at a center of the air circulation device, a ring at an outer periphery of the air circulation device and extending in a first plane, and slats extending from the apex to the ring. The slats extend at a non-zero and non-perpendicular angle with respect to the first plane.

The presently disclosed embodiments further relate to an appliance including a base, a fuel cage located within the base and configured to accept fuel to be combusted, and an air circulation device located above the fuel cage. The air circulation device includes an apex at a center of the air circulation device, a ring at an outer periphery of the air circulation device and extending in a first plane, and slats extending from the apex to the ring. The slats define openings between the slats that direct air in a partially horizontal manner.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
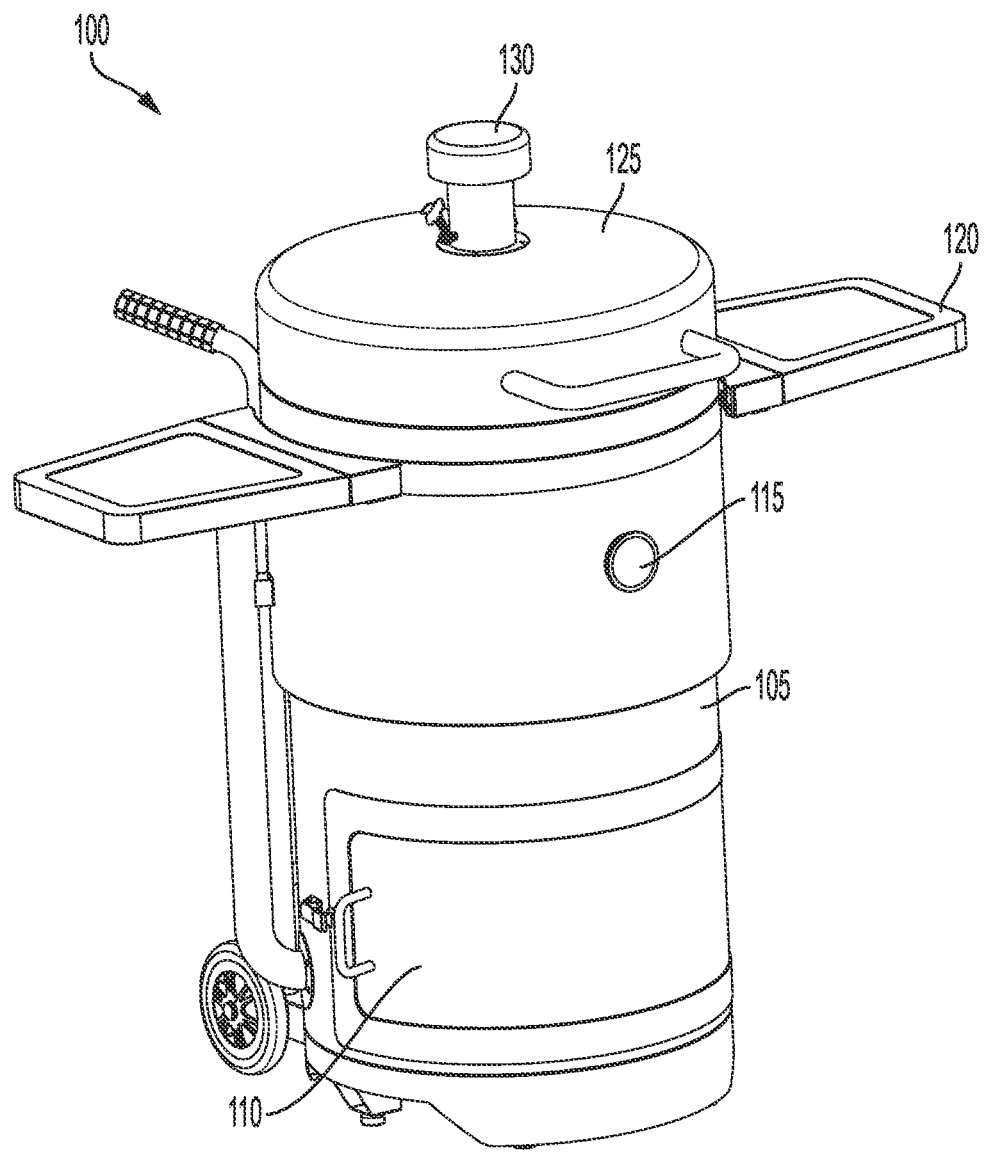
FIG. 1 is a front perspective view of an appliance according to at least one of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments relate generally to an air circulation device for an outdoor cooking appliance. The air circulation device causes a cyclonic effect for air exiting the device by providing angled slats that direct the air in this manner. For example, the slats can extend along a non-zero angle with respect to the plane in which the device sits and direct rising air more horizontally as a result. The cyclonic effect can distribute heat and smoke more evenly to the food being cooked, potentially providing better smoke penetration and a deeper smoke ring with more effective and efficient cooking.

Figure 2:
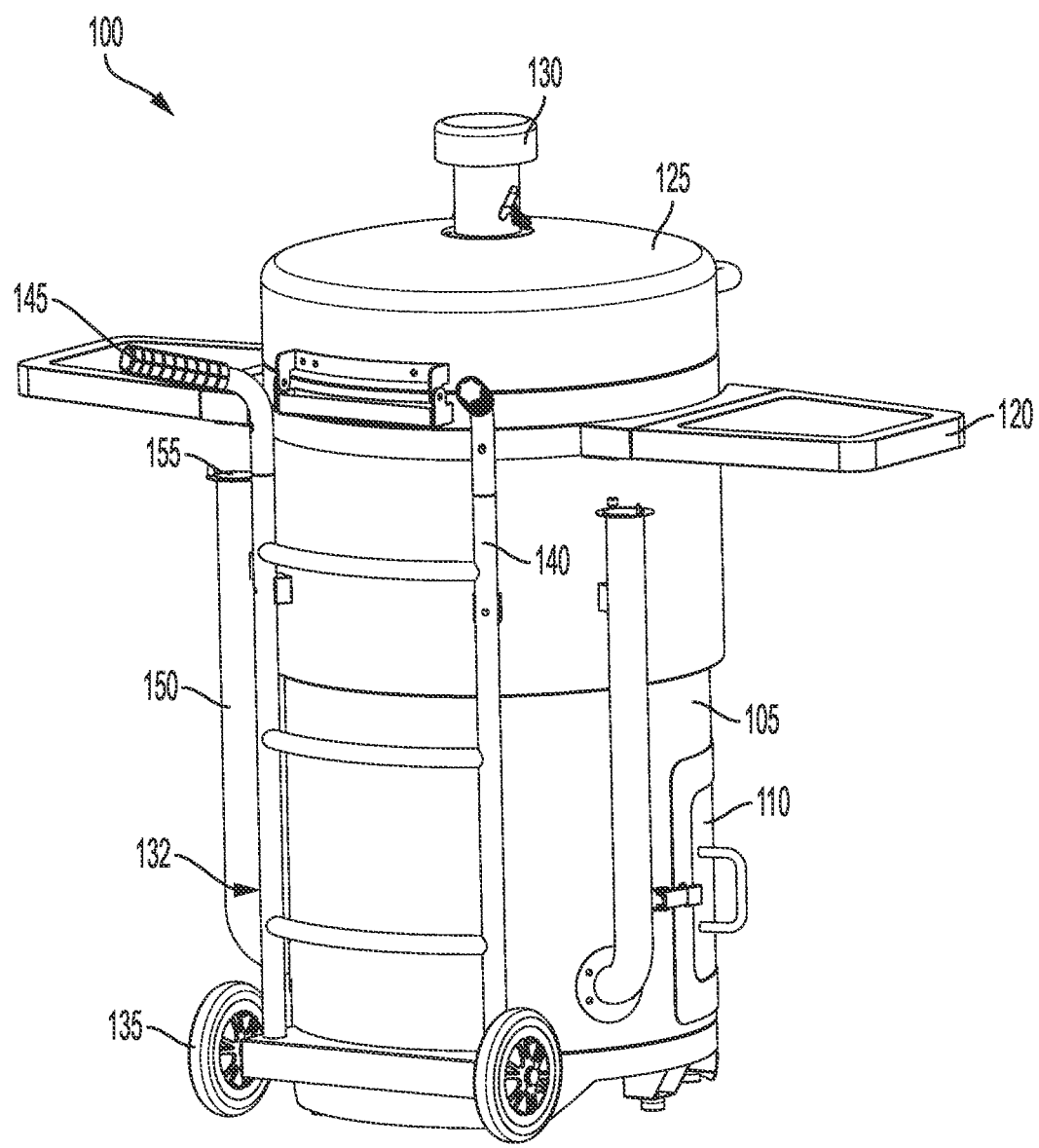
FIG. 2 is a rear perspective view of an appliance according to at least one of the presently disclosed embodiments.

FIG. 1 is a front perspective view, and FIG. 2 is a rear perspective view, of an appliance 100 according to at least one of the presently disclosed embodiments. As shown, the appliance 100 includes a base 105 that acts as the structural backbone of the appliance, and a fuel chamber 110 that is openable so as to selectively provide fuel to the appliance 100. The fuel can be any matter that can be combusted so as to provide heat and/or smoke to the appliance, and in a preferred embodiment is charcoal, wood, or pellets. The base 105 can further include a thermometer 115 to allow the user to determine the temperature of the appliance 100 and to make any appropriate adjustments so as to reach a higher or lower target temperature.

In certain embodiments, the appliance 100 is a grill or smoker. For example, the appliance 100 can include a shelf 120 that the user can use to place utensils, food, dishes, or any other objects on during the grilling or smoking process. The appliance 100 can also include a hinged lid 125 that is openable to allow access to a cooking area during use, and a chimney 130 that allows the release of smoke and heat from the appliance 100 during use.

As shown best in FIG. 2, the appliance 100 can include certain features that allow the appliance 100 to be more portable and easier to use. For example, the appliance 100 can include a dolly configuration 132 that includes wheels 135 contacting the ground upon which the appliance 100 rests, and a frame 140 that structurally connects the dolly configuration 132 with the base 105 of the appliance 100. The dolly configuration 132 can further include one or more grips 145 that a user can grasp when moving the appliance 100 from one location to another.

As shown in FIG. 2, the appliance 100 can further include air intake tubes 150 that allow air to enter the base 105 for better air distribution and circulation. The air intake tubes 150 can be adjusted via a flange 155 that is selectively openable or closable by any known means. The flange 155 can therefore allow the user to adjust the amount of air flowing into the base 105 so as to control the temperature of the appliance 100. The flange 155 can be operated manually by the user, for example by lifting or adjusting the flange 155. Alternatively, the flange 155 can be automatically adjusted through a feedback loop or thermostat-type operation, for example, through a program that changes or holds the temperature of the base 105 according to user-defined or automatically-defined parameters.

Figure 3:
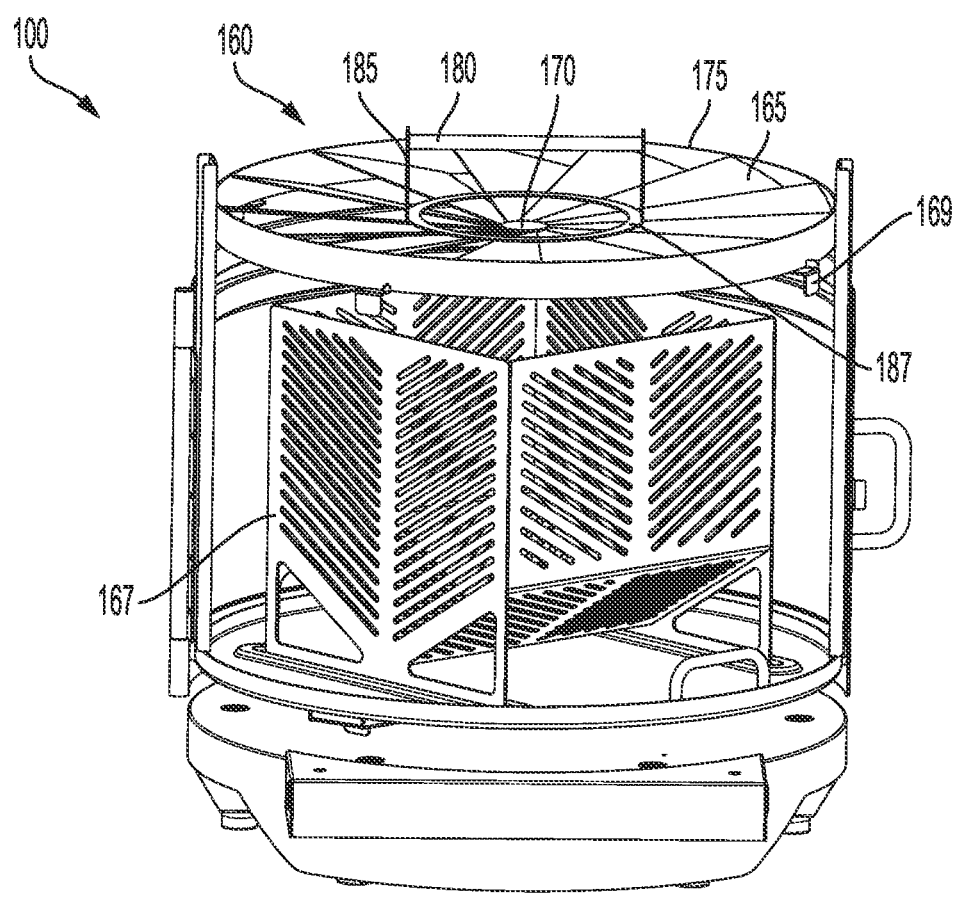
FIG. 3 is a partial rear view of an appliance with certain elements of the appliance removed, according to at least one of the presently disclosed embodiments.

FIG. 3 is a partial rear view of an appliance 100 with certain elements of the appliance 100 removed, according to at least one of the presently disclosed embodiments. As shown, the appliance can include an air circulation device 160 that directs air, heat, and smoke in a more uniform manner throughout the appliance 100 to improve the efficiency of operation and potentially the penetration of smoke into food being cooked. The air circulation device 160 can include slats 165 that direct the air in such a manner as to cause a cyclonic effect of the smoke and heat rising from a fuel cage 167 containing combusting fuel. As shown, the air circulation device 160 can rest on one or more tabs 169 and can extend horizontally or radially in a first plane. The slats 165 can extend from an apex 170 at the center of the air circulation device 160 to a ring 175 at an outer periphery of the air circulation device 160. The slats 165 can extend at a non-zero and non-perpendicular angle with respect to the first plane so as to cause the rising air to "spiral" into a cyclone arrangement. In some embodiments, the slats 165 are arranged at the same angle with respect to the first plane to cause a more uniform cyclone to circulate throughout the appliance 100.

In some embodiments, it is useful for a user to be able to remove and insert the air circulation device 160. For example, the user may wish to access the fuel cage 167 to remove or add fuel, or may wish to try the appliance 100 without the air circulation device 160 resting within it, for example, during direct heat grilling. For at least these reasons, the air circulation device 160 can include a handle 180 that can be gripped by a user so as to remove the air circulation device 160 when necessary or desired by the user. The handle 180 can be connected to brackets 185 that connect the handle 180 to a handle ring 187 on the air circulation device 160. The handle ring 187 can act as a structural backbone of the handle 180 and can connect the handle 180 to the slats 165 or any other portion of the air circulation device 160 so as to provide structural stability of the handle 180.

Figure 4:
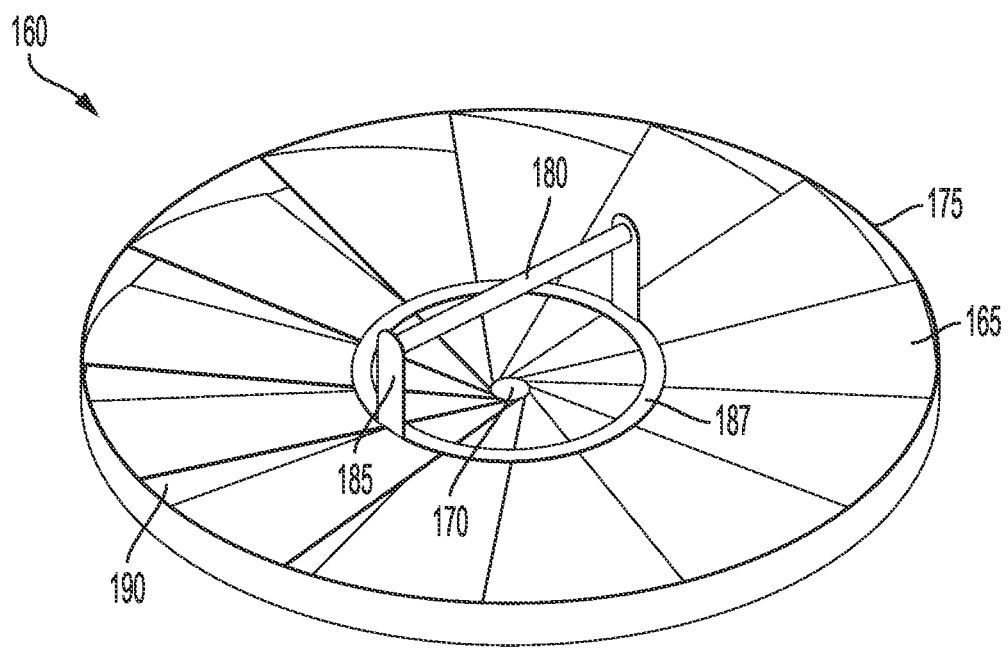
FIG. 4 is a top perspective view of an air circulation device according to at least one of the presently disclosed embodiments.
Figure 5:
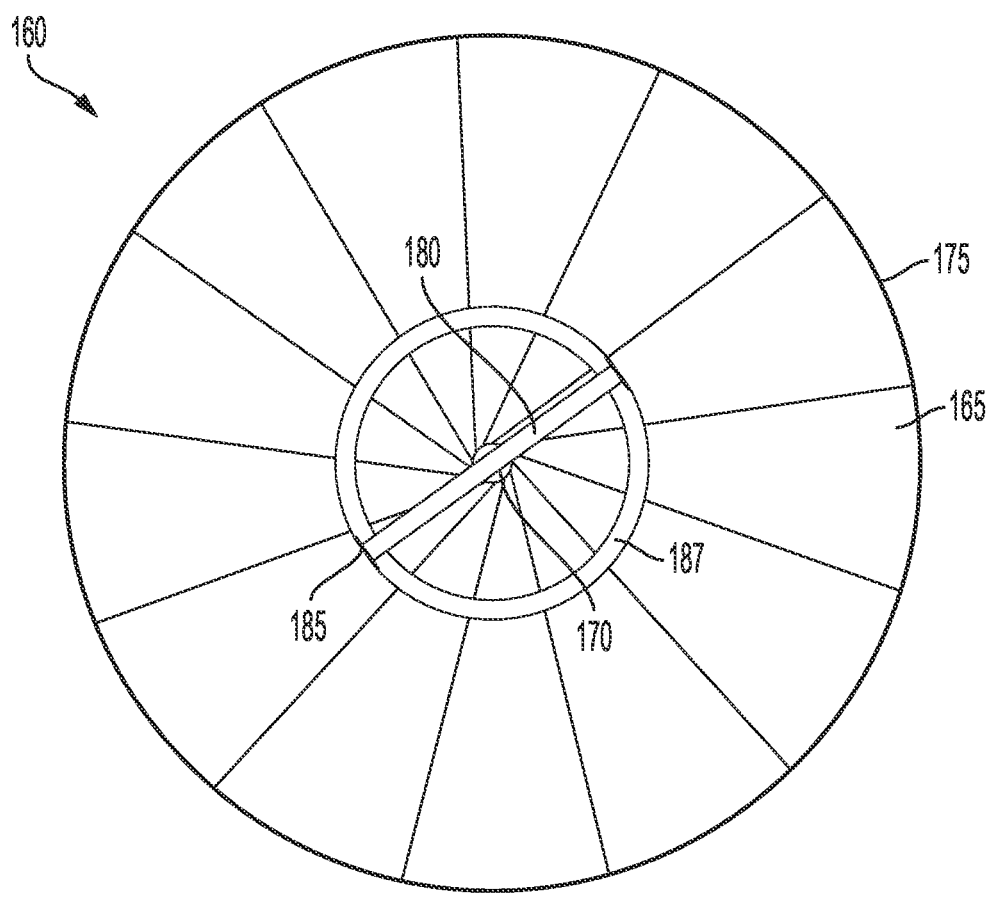
FIG. 5 is a top view of an air circulation device according to at least one of the presently disclosed embodiments.

FIG. 4 is a top perspective view of the air circulation device 160, and FIG. 5 is a top view of an air circulation device, according to at least one of the presently disclosed embodiments. As shown, the slats 165 of the air circulation device 160 can extend radially from the apex 170 at a non-zero and non-perpendicular angle, for example, with respect to the first plane in which the ring 175 extends. The slats 165 can also extend axially from a top plane of the ring 175 to a bottom plane of the ring 175 opposite the top plane, so as to extend along an entire width or height of the ring 175. If the ring 175 is rectangular or other shaped, the slats 165 can extend from a center of the shape to the outer periphery, and from a top plane of the shape to a bottom plane opposite the top plane. This configuration provides a more structurally stable slat 165 arrangement for improved durability and effectiveness during use.

As shown in FIGS. 4 and 5, the arrangement of the slats 165 provides openings 190 through which smoke, air, and heat can pass from the fuel cage 167 below. For example, the slats 165 can be angled and provide for a smaller opening 190 as compared to the diameter of the base 105, causing a Bernoulli effect where the velocity of the air exiting the air circulation device 160 is higher than if the air circulation device 160 were not present. By being angled, the slats 165 can further cause the air to flow at this higher velocity in a partially horizontal manner and, along with the vertical rise of hot air, will cause the air to flow in a cyclonic manner. The air circulation device 160 can therefore improve cooking efficiency, heat and smoke penetration, and potentially increase the depth of a "smoke ring" on cooked food.

As discussed herein, the appliance 100 can be a circular grill or smoker with a circular cross-section base 105. However, any shaped base 105 or ring 175 can be implemented without departing from the spirit and scope of the present invention.

The presently disclosed embodiments have been described herein as being integrated within outdoor cooking appliances such as grills. However, the present invention is not so limited and can be used with heaters, furnaces, or any other device where air circulation and direction can be improved.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An appliance comprising:
a base;

a fuel cage located within the base and configured to accept fuel to be combusted; and an air circulation device located above the fuel cage, wherein the air circulation device includes:

an apex at a center of the air circulation device;

a ring at an outer periphery of the air circulation device and extending in a first plane, the ring extending in the axial direction from a first extreme end to a second extreme end; and slats extending from the apex to the ring, wherein the slats extend at a non-zero and non-perpendicular angle with respect to the first plane, the slats having a lower-most point connecting to the ring at the first extreme end and having an upper-most point connecting to the ring at the second extreme end;

a handle ring located radially between the apex and the ring, wherein the handle ring is coupled to at least one of the apex, slats, and ring; and a handle coupled to the handle ring; and wherein the appliance is a grill or smoker.

2. The appliance of claim 1, wherein the slats extend at a same angle as one another.

3. The appliance of claim 1, further comprising one or more tabs disposed within the base, and wherein the air circulation device is removably placed on the tabs.

4. The appliance of claim 1, wherein the handle ring is coupled to at least one of the apex, slats, and ring by one or more brackets.

5. The appliance of claim 1, further comprising a dolly configuration including a frame coupled to the base and to one or more wheels.

6. The appliance of claim 5, wherein the dolly configuration further comprises one or more grips coupled to the frame.

7. The appliance of claim 1, wherein the ring is circular in shape.

8. An appliance comprising:

a base;

a fuel cage located within the base and configured to accept fuel to be combusted; and an air circulation device located above the fuel cage, wherein the air circulation device includes:

an apex at a center of the air circulation device;

a ring at an outer periphery of the air circulation device and extending in a first plane, the ring extending in the axial direction from a first extreme end to a second extreme end;

slats extending from the apex to the ring, wherein the slats define openings between the slats that direct air in a partially horizontal manner, the slats having a lower-most point connecting to the ring at the first extreme end and having an upper-most point connecting to the ring at the second extreme end;

a handle ring located radially between the apex and the ring, wherein the handle ring is coupled to at least one of the apex, slats, and ring; and a handle coupled to the handle ring; and wherein the appliance is a grill or smoker.

9. The appliance of claim 8, wherein the slats extend at a non-zero, non-perpendicular angle to one another.

10. The appliance of claim 8, wherein the slats extend at a same angle as one another.

11. The appliance of claim 8, further comprising one or more tabs disposed within the base, and wherein the air circulation device can be removably placed on the tabs.

12. The appliance of claim 8, wherein the handle ring is coupled to at least one of the apex, slats, or ring by one or more brackets.

13. The appliance of claim 12, wherein the handle ring couples the brackets to the slats.

14. The appliance of claim 8, further comprising a dolly configuration including a frame coupled to the base and to one or more wheels.

15. The appliance of claim 14, wherein the dolly configuration further comprises one or more grips coupled to the frame.

16. The appliance of claim 8, wherein the ring is circular in shape.

* * * * *